US012518225B2

(12) United States Patent
Tanaka

(10) Patent No.: US 12,518,225 B2
(45) Date of Patent: Jan. 6, 2026

(54) INFORMATION PROCESSING APPARATUS AND INFORMATION PROCESSING METHOD

(71) Applicant: Toshiba Tec Kabushiki Kaisha, Tokyo (JP)

(72) Inventor: Hiroyo Tanaka, Koto Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 107 days.

(21) Appl. No.: 18/629,772

(22) Filed: Apr. 8, 2024

(65) Prior Publication Data
US 2025/0013943 A1    Jan. 9, 2025

(30) Foreign Application Priority Data
Jul. 3, 2023   (JP) .................................. 2023-109129

(51) Int. Cl.
*G06Q 10/0631*   (2023.01)
(52) U.S. Cl.
CPC ................................ *G06Q 10/0631* (2013.01)
(58) Field of Classification Search
None
See application file for complete search history.

(56) References Cited

U.S. PATENT DOCUMENTS

| | | | | |
|---|---|---|---|---|
| 8,024,363 | B2 * | 9/2011 | Araki ..................... | G06F 16/188 707/791 |
| 2011/0137637 | A1 * | 6/2011 | Takahashi ............... | G06F 9/454 704/8 |
| 2018/0026910 | A1 * | 1/2018 | Balle ...................... | G06F 3/0665 |
| 2021/0158427 | A1 * | 5/2021 | Jobetto .................. | G06F 3/1273 |

FOREIGN PATENT DOCUMENTS

| | | | | |
|---|---|---|---|---|
| JP | 2014-235470 A | | 12/2014 | |
| WO | WO-02079928 A2 | * | 10/2002 | ............. H04L 63/02 |
| WO | WO-2018156781 A1 | * | 8/2018 | ........... G06Q 10/103 |

OTHER PUBLICATIONS

Nadine "Improving Information Processing Capacities in Service Value Chains: Design Concept, Prototype and Evaluation", Dec. 2011, ECIS 2011 Proceedings, p. 1 (Year: 2011).*

* cited by examiner

*Primary Examiner* — Romain Jeanty
(74) *Attorney, Agent, or Firm* — Kim & Stewart LLP

(57) ABSTRACT

In accordance with an embodiment, an information processing apparatus selects a service node on the basis of tree data including a goal node indicating a management goal and a service node indicating contents of a service for realizing the goal. The information processing apparatus extracts verification items associated with effect verification of the contents of the service on the basis of the goal node associated with the selected service node. In addition, the information processing apparatus provides a screen that allows setting, for each of the extracted verification items, a specification associated with effect verification of the verification item.

8 Claims, 12 Drawing Sheets

261

| Tree ID | Client name | Data file |
|---|---|---|
| T01 | ABC supermarket | Data_T01 |
| T02 | DEF supermarket | Data_T02 |
| ⋮ | ⋮ | ⋮ |

Fig.4

| Target service | Flow ID | Business flow name | Data file |
|---|---|---|---|
| T01-Ea | F01 | Service A | Data_F01 |
| T02-Ea | F01 | Service A | Data_F01 |
| ⋮ | ⋮ | ⋮ | ⋮ |

| Target service | Verification item ID | Item name | Data file |
|---|---|---|---|
| T01-Ea | 1 | Sales | Data_DE01 |
| | 2 | Average sales per customer | Data_DE01 |
| | ⋮ | ⋮ | ⋮ |
| ⋮ | ⋮ | ⋮ | ⋮ |

Fig.8

< Definition of KPI: Service A: ID5

| | |
|---|---|
| Item name | Coupon use rate |
| Display unit | % |
| Number of digits after decimal point of numeric value | 0 |
| Definition of numeric value and calculation expression | Number of coupons used/Number of coupons issued |
| Availability | Development is necessary ▽ |
| Aggregation period | Monthly ▽ |
| Deadline | 25th |
| Aggregation unit 1 | 04/2022, 05/2022, 06/2022 |
| Aggregation unit 2 | POS1,POS2,POS3 |
| Display format | Line graph ▽ |

Figure

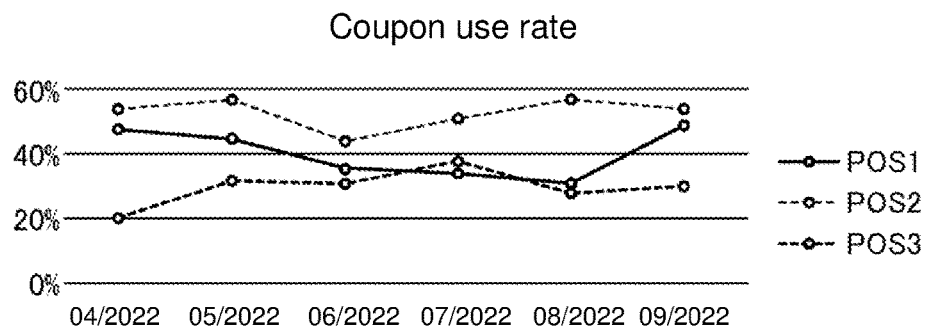

Fig.11

INFORMATION PROCESSING APPARATUS AND INFORMATION PROCESSING METHOD

CROSS-REFERENCE TO RELATED APPLICATION

This application is based upon and claims the benefit of priority from the prior Japanese Patent Application No. 2023-109129, filed on Jul. 3, 2023, the entire contents of which are incorporated herein by reference.

FIELD

An embodiment described here generally relates to an information processing apparatus and an information processing method.

BACKGROUND

At sites such as stores, various business services (hereinafter, also referred to as services) are executed. In such a site, a procedure of each element associated with the service execution may be designed as a business flow by using a method such as a key performance indicator (KPI) tree or business process model and notation (BPMN). For example, a technology capable of automatically generating a business flow so that an input/output relationship between adjacent business tasks is continuous has been conventionally proposed.

By the way, in the above-mentioned service design process, it is important to define (hereinafter, also referred to as set) a specification associated with effect verification of the service on the basis of goal contents set as a final goal or an intermediate goal. However, the conventional technologies have not considered any settings of the specification associated with the effect verification of the service. Therefore, there is a room for improving the convenience.

BRIEF DESCRIPTION OF THE DRAWINGS

FIG. 4 is a diagram showing an example of a data configuration of a KPI tree DB according to the embodiment.

FIG. 6 is a diagram showing an example of a data configuration of a business flow DB according to the embodiment.

FIG. 8 is a diagram showing an example of a data configuration of a service definition DB according to the embodiment.

FIG. 11 is a diagram showing an example of the screen provided by the design support unit according to the embodiment.

DETAILED DESCRIPTION

In accordance with an embodiment, an information processing apparatus includes a tree database, a display device, an operation device, a memory, and a processor. The tree database that stores tree data in which a relationship between a goal node indicating a management goal and a service node indicating contents of a service for realizing the goal is set in a tiered manner in a tree structure. The display device displays a screen for setting the specification associated with effect verification of the service. The operation device receives an operation with respect to the displayed screen. The memory stores a program for setting the specification associated with the effect verification of the service. The processor, in accordance with the program, causes the display device to display a tree including the goal node and service node connected in a tiered manner on the basis of the tree data. The processor selects the service node included in the displayed tree via an operation received by the operation device. The processor extracts verification items associated with effect verification of the contents of the service on the basis of goal contents of the goal node associated with the selected service node. In addition, the processor causes the display device to display a screen that allows setting, for each of the extracted verification items, a specification associated effect verification of the verification item.

Hereinafter, an embodiment will be described in detail with reference to the drawings. In each figure, the same reference signs will denote the same or similar portions. It should be noted that the embodiment should not be limited to the following descriptions.

Figure 1:
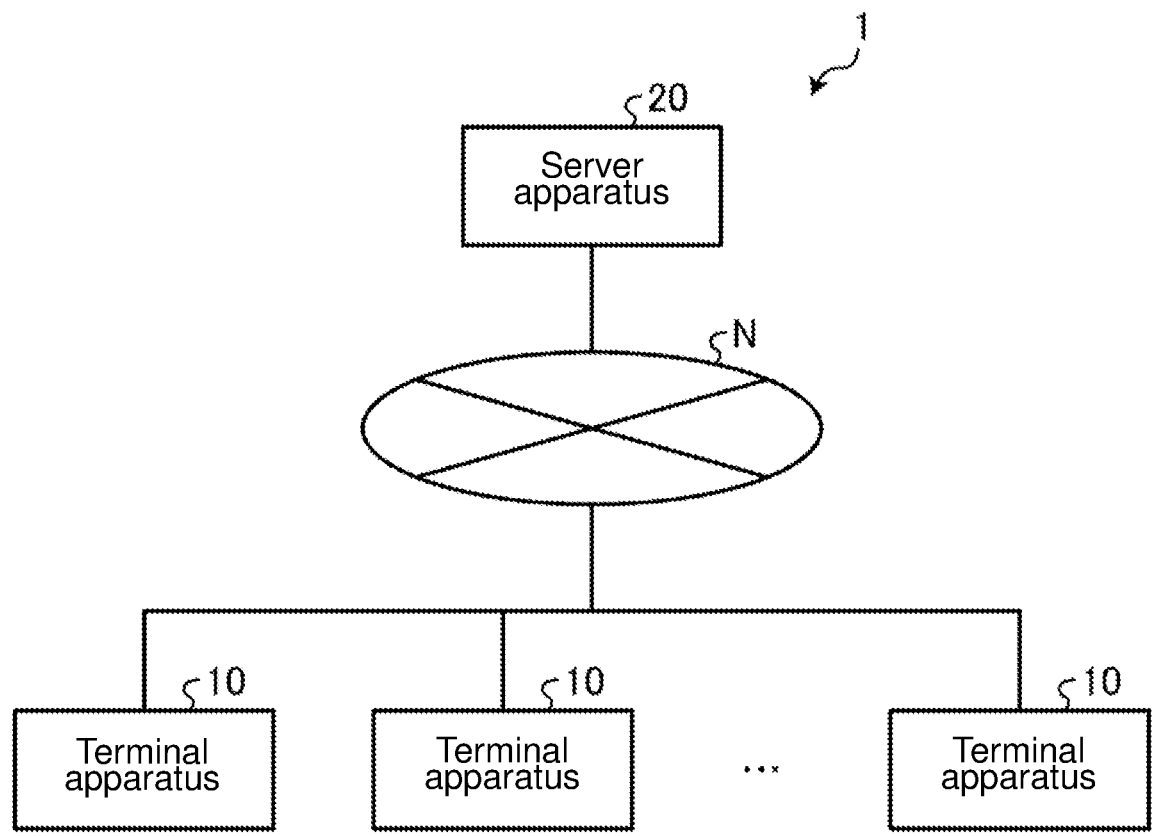
FIG. 1 is a diagram showing a configuration example of a business support system according to an embodiment.

FIG. 1 is a diagram showing a configuration example of a business support system according to the embodiment. As shown in FIG. 1, a business support system includes a terminal apparatus 10 and a server apparatus 20. The terminal apparatus 10 and the server apparatus 20 are connected to be capable of communicating with each other via a network N such as a local area network (LAN).

The terminal apparatus 10 is a terminal apparatus used by a user of the business support system 1. The terminal apparatus 10 executes various types of processing in accordance with a user operation. For example, the user operates the terminal apparatus 10 to access the server apparatus 20, such that the user can use various functions provided by the server apparatus 20. The terminal apparatus 10 can be realized by an installed terminal apparatus such as a personal computer (PC) or a portable terminal apparatus such as a laptop PC, a tablet terminal, or a smartphone.

The server apparatus 20 is an example of an information processing apparatus. The server apparatus 20 provides the terminal apparatus 10 with various functions. The server apparatus 20 provides, for example, functions of generating and browsing a KPI tree and a business flow to be described later.

It should be noted that although an example in which a single information processing apparatus realizes the server apparatus 20 will be described in the present embodiment, the present technology is not limited thereto. For example, a plurality of information processing apparatuses may realize the server apparatus 20 in accordance with a technology such as a cloud computing.

Next, configurations of the terminal apparatus 10 and the server apparatus 20 will be described.

Figure 2:
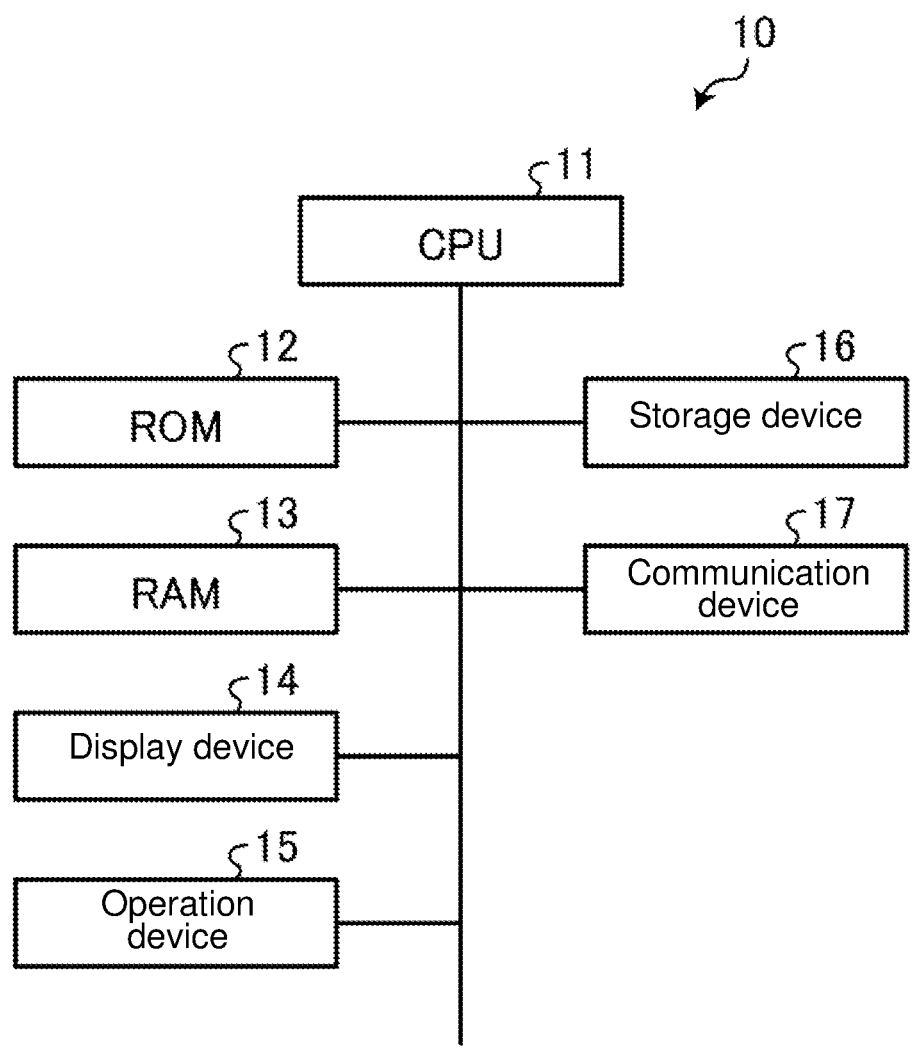
FIG. 2 is a diagram showing an example of a hardware configuration of a terminal apparatus according to the embodiment.

FIG. 2 is a diagram showing an example of a hardware configuration of the terminal apparatus 10. As shown in FIG. 2, the terminal apparatus 10 includes computer configurations such as a processor, a memory central processing unit (CPU) 11, a read only memory (ROM) 12, and a random access memory (RAM) 13, for example.

The CPU 11 is an example of a processor and comprehensively controls blocks of the terminal apparatus 10. The ROM 12 stores various programs. The RAM 13 is a work space for developing the programs and various types of data.

Moreover, the terminal apparatus 10 includes a display device 14, an operation device 15, a storage device 16, and a communication device 17.

The display device 14 is constituted by a liquid crystal display (LCD) and the like. The display device 14 displays various types of information under the control of the CPU 11. The operation device 15 includes a keyboard, a pointing device, and the like. The operation device 15 outputs operation contents received from the user to the CPU 11. It should be noted that the operation device 15 may be a touch panel provided on a display screen of the display device 14.

The storage device 16 is constituted by a storage medium such as a hard disk drive (HDD) or a flash memory and maintains storage contents also when the storage device 16 is powered off. The storage device 16 stores the programs that can be executed by the CPU 11 and various types of setting information. For example, the storage device 16 stores application programs such as web browsers that enable the use of various functions provided by the server apparatus 20.

The CPU 11 operates in accordance with the programs stored in the ROM 12 and the storage device 16 and developed in the RAM 13, such that the CPU 11 can execute various types of processing.

The communication device 17 is a communication interface connectable to the network N. The communication device 17 communicates with an external apparatus such as the server apparatus 20 via the network N.

Figure 3:
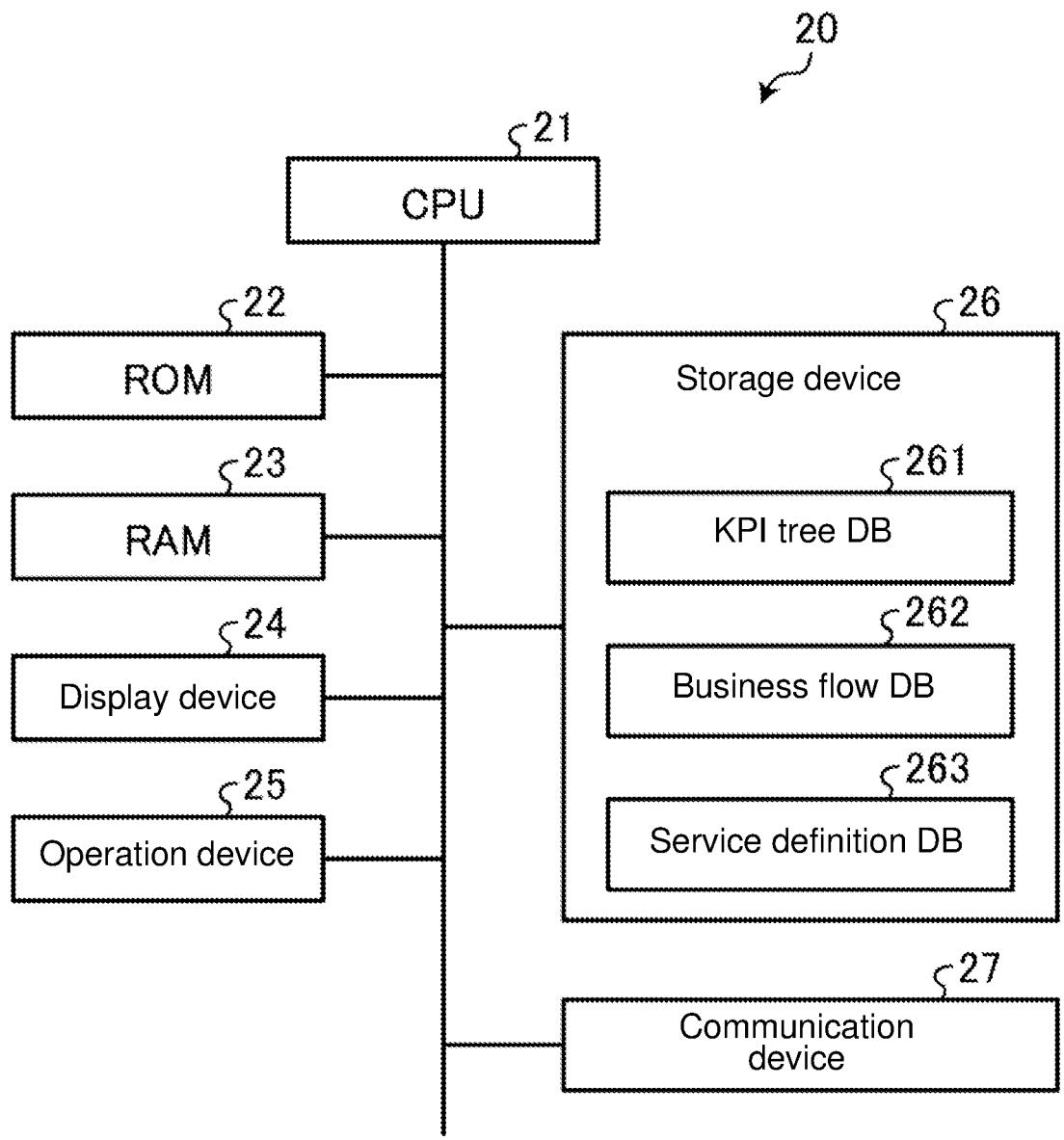
FIG. 3 is a diagram showing an example of a hardware configuration of a server apparatus according to the embodiment.

FIG. 3 is a diagram showing an example of a hardware configuration of the server apparatus 20. As shown in FIG. 3, the server apparatus 20 includes computer configurations such as a CPU 21, a ROM 22, and a RAM 23.

The CPU 21 is an example of the processor and comprehensively controls blocks of the server apparatus 20. The ROM 22 stores various programs. The RAM 23 is a work space for developing the programs and various types of data.

Moreover, the server apparatus 20 includes a display device 24, an operation device 25, a storage device 26, and a communication device 27.

The display device 24 is constituted by an LCD and the like. The display device 24 displays various types of information under the control of the CPU 21. The operation device 25 includes a keyboard, a pointing device, and the like. The operation device 25 outputs operation contents received from the user to the CPU 11. It should be noted that the operation device 25 may be a touch panel provided on a display screen of the display device 24.

The storage device 26 is constituted by a storage medium such as an HDD or a flash memory and maintains storage contents also when the storage device 26 is powered off. The storage device 26 stores the programs that can be executed by the CPU 21 and various types of setting information. For example, the storage device 26 stores web application programs that enable the terminal apparatus 10 to be provided with various functions. The CPU 21 operates in accordance with the programs stored in the ROM 22 and the storage device 26 and developed in the RAM 23, such that the CPU 21 can execute various types of processing.

Moreover, the storage device 26 stores a KPI tree DB 261, a business flow DB 262, and a service definition DB 263, for example.

The KPI tree DB 261 is a database for storing and managing a KPI tree. This database may be a table. Here, the KPI tree is tree data with a tree structure in which a relationship between a management goal (final goal to be described later) of an organization or company and measures (e.g., intermediate goals, factors, solution methods, and services to be described later) for realizing the goal is set by nodes in a tiered manner.

FIG. 4 is a diagram showing an example of a data configuration of the KPI tree DB 261. As shown in FIG. 4, the KPI tree DB 261 stores a client name, a KPI tree, and the like in association with a tree ID which is data capable of identifying the KPI tree.

In the item of the client name, information capable of identifying a client to which the KPI tree is applied is registered. Moreover, in the item of the data file, for example, actual data (hereinafter, also referred to as a data file) of the KPI tree or an address indicating where this data file is stored is registered.

The KPI tree is generated using a method such as a key performance indicator (KPI). The KPI tree can be expressed in a visualized state, for example, as shown in FIG. 5.

Figure 5:
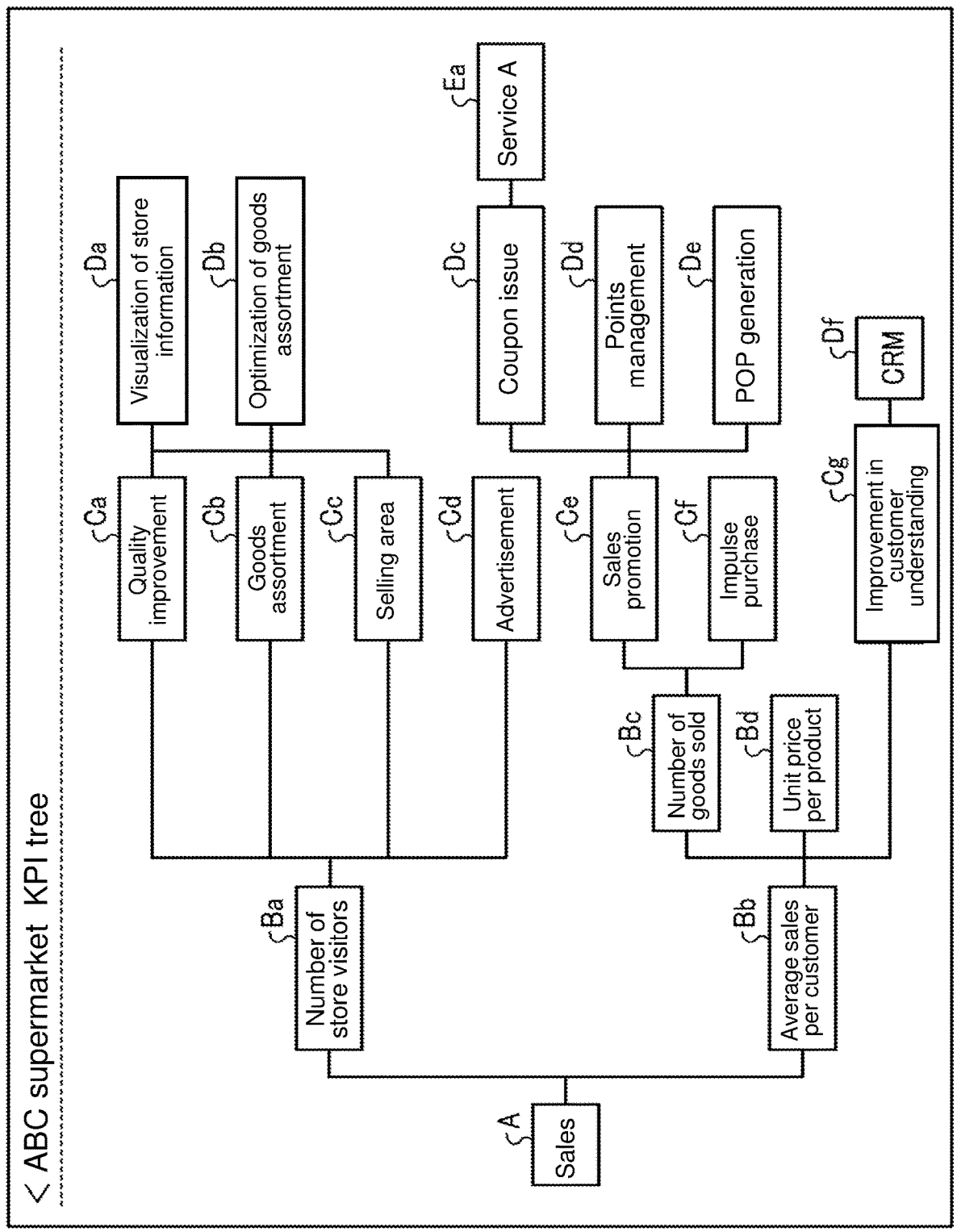
FIG. 5 is a diagram showing an example of a KPI tree according to the embodiment in a visualized state.

FIG. 5 is a diagram showing an example of a KPI tree in a visualized state. It should be noted that FIG. 5 shows a KPI tree applied to the client name "ABC supermarket" shown in FIG. 4 in a visualized state.

As shown in FIG. 5, the KPI tree is constituted by a plurality of nodes connected in a tree structure form. Here, a final goal node A as a route node is a node for setting a goal to be accomplished. The final goal node A corresponds to, for example, a key goal indicator (KGI). For example, in a case where sales promotion at a store is set as a final goal, "Sales" indicating the goal contents is set to the final goal node A, for example.

One or more intermediate goal nodes B are connected to the final goal node A. Moreover, one or more intermediate goal nodes B can be further connected to each intermediate goal node B. To the intermediate goal node B, an intermediate goal for accomplishing a goal (final goal or intermediate goal) set to its parent node is set. The intermediate goal node B corresponds to, for example, a key performance indicator (KPI).

FIG. 5 shows an example in which an intermediate goal node Ba to which an increase in the number of store visitors is set and an intermediate goal node Bb to which an increase in average sales per customer is set are arranged below the final goal node A as goal contents of the intermediate goal. Moreover, an example in which an intermediate goal node Bc to which an increase in the number of goods sold is set and an intermediate goal node Bd to which an increase in unit price per product is set are arranged below the intermediate goal node Bb as goal contents of the intermediate goal.

Moreover, a factor node C representing a factor for realizing the intermediate goal set to the intermediate goal node B can be arranged below the intermediate goal node B in the KPI tree. The factor node C corresponds to, for example, a key success factor (KSF).

FIG. 5 shows an example in which factor nodes Ca to Cd to which "Quality improvement," "Goods assortment," "Selling area," and "Advertisement" are respectively set are arranged below the intermediate goal node Ba as factors for realizing the increase in the number of store visitors. Moreover, an example in which factor nodes Ce and Cf to which "Sales promotion" and "Impulse purchase" are set are arranged below the intermediate goal node Bc as factors for realizing an increase in the number of goods sold is shown. Moreover, an example in which a factor node Cg to which "Improvement in customer understanding" is set is arranged below the intermediate goal node Bb as a factor for realizing the increase in average sales per customer is shown.

Moreover, a solution node D representing a solution method of realizing (solving) an intermediate objective or factor set to the parent node can be arranged below the intermediate goal node B or the factor node C in the KPI tree.

FIG. 5 shows an example in which solution nodes Da and Db to which "Visualization of store information" and "Optimization of goods assortment" are respectively set are arranged below factor nodes Ca to Cc. Moreover, FIG. 5 shows an example in which solution nodes Dc to De to which "Coupon issue," "Points management," and "POP generation" are set are arranged below the factor node Ce. Moreover, FIG. 5 shows an example in which a solution node Df to which "Customer relationship management (CRM)" is set is arranged below the factor node Cg.

Moreover, a service node E representing a specific service for realizing the factor or the solution method set to the parent node can be arranged below the factor node C or the solution node D in the KPI tree. Here, the service node E is located at the end of the tree structure and is a specific measure for realizing the factor or the solution method set to the parent node.

FIG. 5 shows an example in which a service node Ea to which a "Service A" is set is arranged below a solution node Dd.

It should be noted that a node ID which is data for identifying each node is added to the nodes constituting the KPI tree. Moreover, information regarding the corresponding node is stored in association with the node ID. For example, the business flow associated with the service execution, the verification item associated with effect verification of the service, and the like are associated with the service node E.

The above-mentioned KPI tree is saved in a JavaScript Object Notation (JSON) format, for example. It should be noted that the saving format of the KPI tree is not limited to the JSON and the KPI tree may be saved in another data format such as Extensible Markup Language (XML).

Referring back to FIG. 3, the business flow DB 262 is a database for storing and managing the business flow. The database may be a table. The business flow is a data file in which elements associated with the business execution and the execution contents executed by these elements are described in a continuous procedure. Specifically, as to elements associated with the service execution, execution contents executed by these elements and a procedure are described as the business flow.

FIG. 6 is a diagram showing an example of a data configuration of the business flow DB 262. As shown in FIG. 6, the business flow DB 262 stores a target service, a flow ID, a business flow name, and a data file in association with each other.

In the item of the target service, information specifying a service corresponding to business set as a description target of the business flow is registered. Specifically, the node ID of the service node E specified as the target service, the tree ID of the KPI tree to which the service node E belongs, and the like are registered. It should be noted that the method of specifying the target service is not limited thereto.

In the item of the flow ID, the flow ID which is data capable of identifying the business flow is registered. In the item of the business flow name, information indicating the name of the business flow is registered. For example, to the business flow name, the name of the service (node name of the service node E), for example, performed by the business flow is set. Moreover, in the item of the data file, for example, the data file of the business flow or an address indicating where this data file is stored is registered.

The business flow is generated by using a flowchart or a method such as business process model and notation (BPMN). It is assumed that the business flow is generated in accordance with the contents of the service. However, in a case where the contents of the service are common or similar, the same business flow can also be used for different KPI trees. FIG. 6 shows an example in which a business flow with a flow ID of "F1" is used in the service node Ea included in each of KPI trees with tree IDs of T01 and T02.

Figure 7:
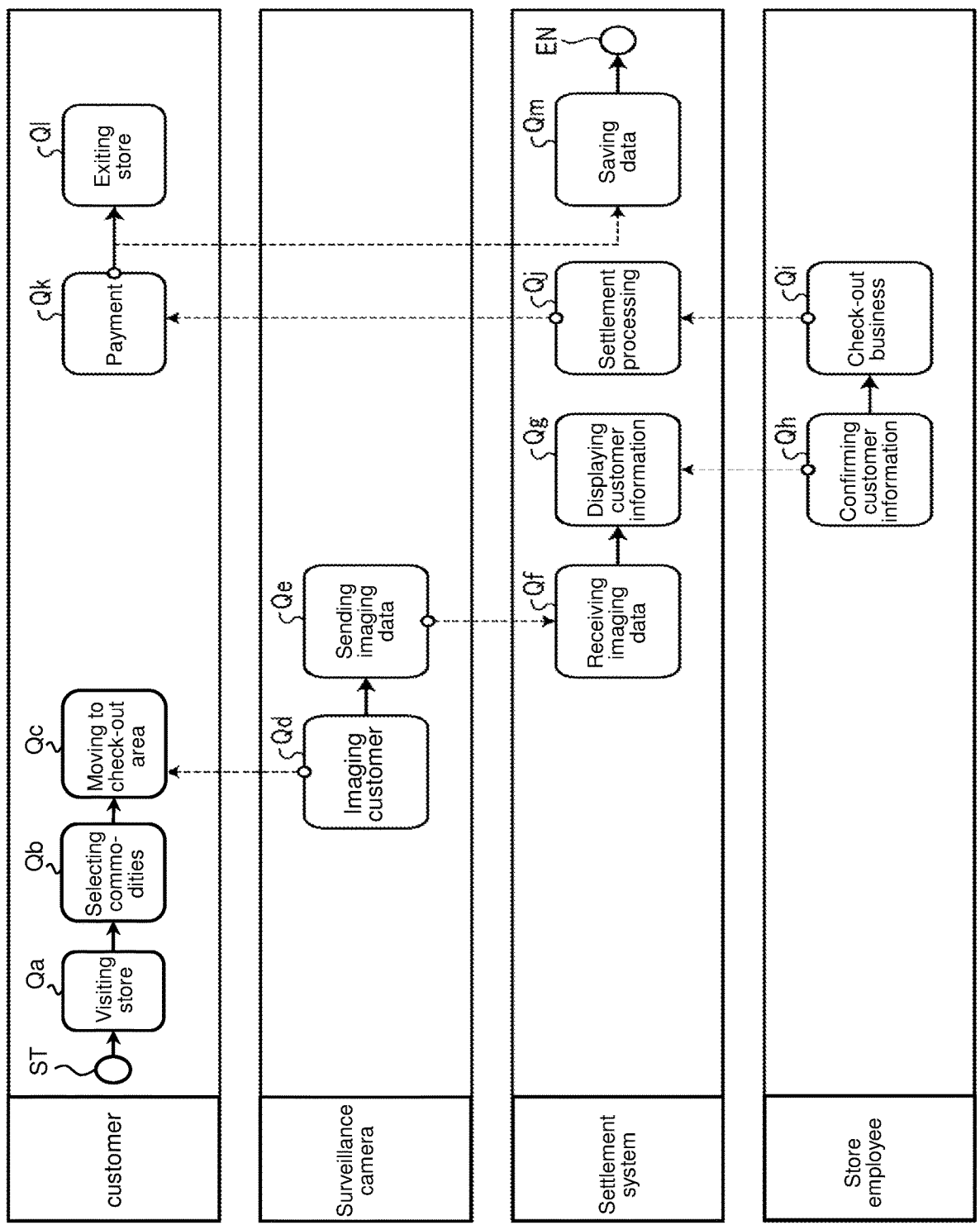
FIG. 7 is a diagram showing an example of a business flow according to the embodiment in a visualized state.

The business flow can be represented in a visualized state, for example, as shown in FIG. 7.

FIG. 7 is a diagram showing an example of the business flow in a visualized state. It should be noted that FIG. 7 is an example of the business flow associated with the service node Ea (service A) of the KPI tree shown in FIG. 5.

As shown in FIG. 7, in the business flow, sequential operation (or processing) contents associated with execution of the service A are described for each element that performs this operation between a start event ST and an end event EN. In the business flow in FIG. 7, an example described using "Customer" who visits the store, "Surveillance camera" and "Settlement system" provided in the store, and "Store employee" who works at the store as elements is shown.

Here, "Surveillance camera" is an example of hardware resources and, for example, a plurality of positions in the store is provided. Moreover, "Settlement system" is an example of software resources and is realized by cooperation of a plurality of personal computers (PCs) such as POSs with applications introduced into the PCs. It should be noted that for example, a service (e.g., a points service) additionally executed, associated with a settlement, may be included in the business flow. Hereinafter, hardware resources and software resources associated with execution of the target service and services additionally executed will be also collectively referred to as "elements."

In the business flow of FIG. 7, first of all, as a flow of "Customer," visiting the store (Step Qa), selecting commodities as purchase targets (Step Qb), and moving to a check-out area (Step Qc) are described. Moreover, as a flow of "Surveillance camera" placed at the store, imaging "Customer" moving to the check-out area (Step Qd) and sending the captured imaging data to the settlement system provided at the store (Step Qe) are described. Moreover, as a flow of "Settlement system," receiving the imaging data from "Surveillance camera" (Step Qf) and displaying customer information such as attributes of "Customer" derived from the imaging data on the display apparatus (Step Qg) are described.

Moreover, as a flow of "Store employee" who operates the check-out area, confirming customer information displayed by "Settlement system" (Step Qh) and executing check-out business for commodities brought by "Customer" (Step Qi) are described. Moreover, "Settlement system" executing "Settlement processing" (Step Qj) along with the check-out business of "Store employee" is described.

Moreover, "Customer" paying for the commodities in accordance with "Settlement processing" of "Settlement system" (Step Qk) and exiting the store (Step Ql) are described. Furthermore, "Settlement system" saving data indicating the breakdown of this transaction along with the payment (Step Qm) is described.

It should be noted that in a case of executing the coupon service, for example, the settlement system issues a coupon for reducing the price or giving a discount depending on the commodities purchased in the settlement processing or the amount of payment and saves the number of coupons issued per day. Moreover, for example, the settlement system reduces the price or gives a discount from the amount of the commodities in accordance with a coupon presented at the time of the settlement processing and saves the number of coupons used per day.

Moreover, in a case of executing the points service, for example, the settlement system checks the imaging data received in Step Qf against a face image of each member registered in advance, thereby determining a membership number of "Customer" represented in the imaging data. Then, the settlement system cumulatively stores points issued depending on the purchase amount in association with the determined membership number.

The above-mentioned business flow is saved in a JSON format, for example. It should be noted that the saving format of the business flow is not limited to the JSON and the business flow may be saved in another data format such as XML.

Referring back to FIG. 3, the service definition DB 263 is a database for storing and managing definition data storing a specification associated with the effect verification of the service which is defined in the service node E. The database may be a table. Here, the effect verification means verifying an effect contributing to the verification items such as the sales in a case where the service is executed. It should be noted that the definition data is an example of setting information.

FIG. 8 is a diagram showing an example of a data configuration of the service definition DB 263. As shown in FIG. 8, the service definition DB 263 stores a target service, a verification item ID, an item name, and a data file in association with each other.

In the item of the target service, information capable of identifying a service as a target is registered. For example, in the item of the target service, the node ID of the service node E, the tree ID of the KPI tree to which the service node E belongs, and the like are registered. The verification item ID and the item name indicate the verification item ID and the item name associated with the effect verification. In the item of the data file, for example, actual data of the definition data in which a specification associated with the effect verification of the verification item is defined (hereinafter, also referred to as set) or an address indicating where this definition data is stored is registered.

It should be noted that in the present embodiment, the KPI tree and the business flow may be generated in advance or may be generated via the terminal apparatus 10 or the like by the server apparatus 20 supporting the generation. In the latter case, for example, the server apparatus 20 provides the terminal apparatus 10 with a screen (graphical user interface (GUI)) for supporting browsing, generation, and editing of the KPI tree and the business flow.

Specifically, the server apparatus 20 provides the terminal apparatus 10 with a screen that allows generation and editing to be performed in a state in which various nodes and a relationship between the nodes are visualized. Then, the server apparatus 20 stores the KPI tree in the KPI tree DB 261 when the generation or editing of the KPI tree is completed.

Moreover, the server apparatus 20 provides a screen that allows generating (editing) the business flow and the definition data to be performed with respect to a service corresponding to the service node E when any service node E included in the KPI tree is selected. Then, when the business flow or definition data is generated, the server apparatus 20 stores the generated business flow or definition data in the corresponding DB in association with the node ID of the service node E and the tree ID.

Referring back to FIG. 3, the communication device 27 is a communication interface connectable to the network N. The communication device 27 communicates with an external apparatus such as the terminal apparatus 10 via the network N.

Figure 9:
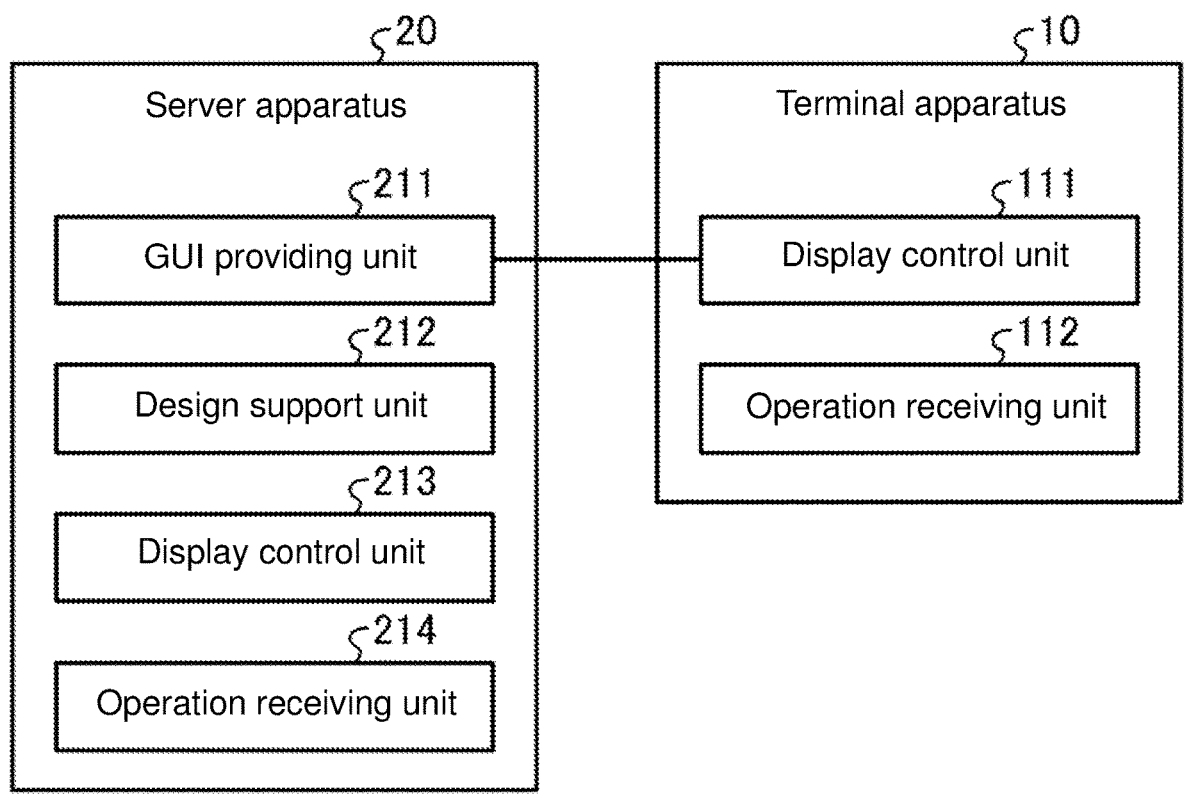
FIG. 9 is a diagram showing an example of functional configurations of the terminal apparatus and the server apparatus according to the embodiment.

Next, functional configurations of the terminal apparatus 10 and the server apparatus 20 will be described with reference to FIG. 9. FIG. 9 is a diagram showing an example of the functional configurations of the terminal apparatus 10 and the server apparatus 20.

As shown in FIG. 9, the terminal apparatus 10 includes a display control unit 111 and an operation receiving unit 112 as functional blocks.

Some or all of the functional blocks of the terminal apparatus 10 may be software configurations realized by cooperation of the processor (e.g., the CPU 11) of the terminal apparatus 10 with the programs stored in the memory (e.g., the ROM 12, the storage device 16). Moreover, some or all of the functional blocks of the terminal apparatus 10 may be hardware configurations realized by a dedicated circuit or the like mounted on the terminal apparatus 10.

The display control unit 111 of the terminal apparatus 10 controls the display device 14 to display various screens on the display device 14. For example, the display control unit 111 displays various operation screens on the display device 14 on the basis of information provided from the server apparatus 20.

The operation receiving unit 112 of the terminal apparatus 10 receives a user operation via the operation device 15. For example, when the operation receiving unit 112 receives an operation with respect to the screen displayed on the display device 14, the operation receiving unit 112 notifies the server apparatus 20 of the operation contents.

On the other hand, the server apparatus 20 includes a GUI providing unit 211, a design support unit 212, a display control unit 213, and an operation receiving unit 214 as functional blocks.

Some or all of the functional blocks of the server apparatus 20 may be software configurations realized by cooperation of the processor (e.g., the CPU 21) of the server apparatus 20 with the programs stored in the memory (e.g., the ROM 22, the storage device 26). Moreover, some or all of the functional blocks of the server apparatus 20 may be hardware configurations realized by a dedicated circuit or the like mounted on the server apparatus 20.

The GUI providing unit 211 cooperates with other functional blocks, thereby providing the terminal apparatus 10 with information that enables various operation screens (hereinafter, also simply referred to as screens) to be displayed. Here, the GUI providing unit 211 may provide data representing the screen or may provide various types of content data associated with the display of the screen. Hereinafter, the GUI providing unit 211 providing the terminal apparatus 10 with information associated with the display of the screen will also be referred to as "providing" the screen or "displaying" the screen.

The design support unit 212 is an example of a first receiving means, an extracting means, a providing means, a second receiving means, an editing means, a generating means, and a storing means. The design support unit 212 cooperates with the GUI providing unit 211, thereby providing a screen for supporting generation of the KPI tree and the business flow and setting tasks of a specification associated with the effect verification of the service.

For example, the design support unit 212 provides a screen that allows generating the KPI tree arranged using various nodes, edges, and the like as plotting parts. Here, the design support unit 212 causes the visualized KPI tree to be displayed in accordance with a user operation. Moreover, the design support unit 212 is capable of associating the business flow (the flow ID) with the service node E of the KPI tree in accordance with a user operation. Then, when the design support unit 212 receives a completion operation of generation or editing of the KPI tree, the design support unit 212 generates a data file representing the KPI tree and stores the data file in the KPI tree DB 261.

Moreover, the design support unit 212 provides a screen that enables selection of the KPI tree which is a target to be browsed or edited on the basis of the KPI tree DB 261. Moreover, when the design support unit 212 selects the KPI tree, the design support unit 212 reads out the KPI tree from the KPI tree DB 261 and provides a screen on which the KPI tree is visualized.

Moreover, the design support unit 212 provides a screen that allows generating the business flow in which plotting parts or the like corresponding to notation rules of the BPMN are arranged. Here, the design support unit 212 displays the visualized business flow in accordance with a user operation. Then, when the design support unit 212 receives a completion operation of generation or editing of the business flow, the design support unit 212 generates a data file representing the business flow and stores the data file in the business flow DB 262 associated with the target service.

Moreover, the design support unit 212 cooperates with the GUI providing unit 211, thereby providing a screen that allows setting and confirming the specification associated with the effect verification of the service. For example, when the design support unit 212 receives selection of the service which is a target from among services registered in the KPI tree in accordance with a user operation, the design support unit 212 provides a screen that allows setting and confirming the specification associated with the effect verification of the selected service.

Specifically, the design support unit 212 receives a selection operation of the service node E registered in the KPI tree as the first receiving means. When the design support unit 212 receives the selection operation of the service node E, the design support unit 212 first determines a goal node associated with the selected service node with respect to the service of the selected service node E as the extracting means. Next, the design support unit 212 extracts verification items associated with the effect verification of the contents of the service on the basis of the goal contents of the determined goal node. Then, the design support unit 212 displays a screen representing the extracted verification items. As an example, when the service node Ea (service A) is selected from the KPI tree shown in FIG. 5, the design support unit 212 displays a screen representing the verification items of the effect verification with respect to the selected service A.

Figure 10:
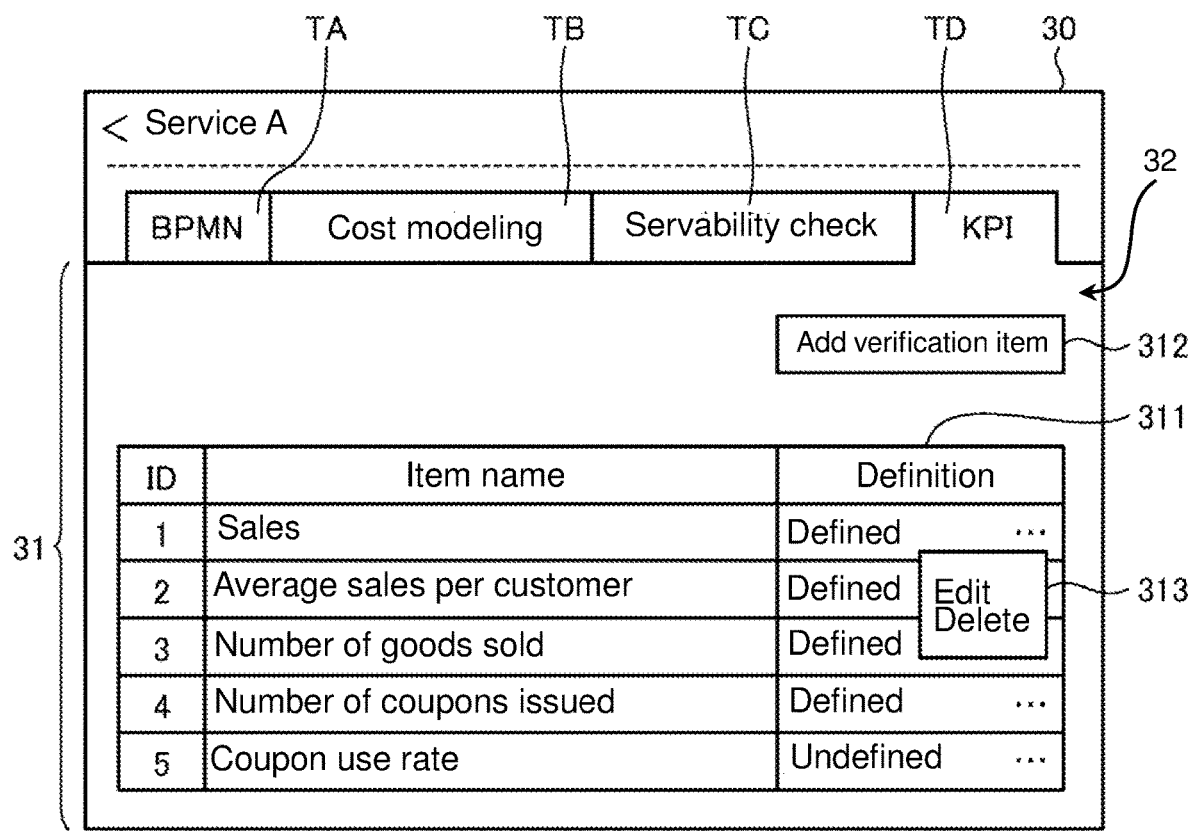
FIG. 10 is a diagram showing an example of a screen provided by a design support unit according to the embodiment.

Here, FIG. 10 is a diagram showing an example of a screen provided by the design support unit 212 as the providing means. As shown in FIG. 10, a setting screen 30 includes tabs TA to TD and a display area 31. The tabs TA to TD indicate a type of setting associated with the selected service node E (service A).

The tab TA corresponding to "BPMN" is an operation element for setting (generating) and confirming the business flow. When the tab TA is selected, for example, the design support unit 212 displays on the display area 31 a screen that allows (e.g., FIG. 7) generating and browsing the business flow in which plotting parts or the like corresponding to the notation rules of the BPMN are arranged.

The tab TB corresponding to "Cost modeling" is an operation element for setting and confirming costs associated with the service execution of the selected service node E. When the tab TB is selected, for example, the design support unit 212 displays on the display area 31 a screen (not shown) that allows setting and browsing the cost associated with the service execution. On such a screen, for example, with respect to elements registered in the business flow (e.g., the surveillance camera and the settlement system), it is possible to set a cost required for introduction, a cost required for operation after the execution, and the like.

The tab TC corresponding to "Servability check" is an operation element for setting and confirming requirements associated with the service execution of the selected service node E. When the tab TB is selected, for example, the design support unit 212 displays on the display area 31 a screen (not shown) that allows setting and browsing check items for checking the requirements associated with the service execution.

The tab TD corresponding to "KPI" is an operation element for editing and confirming the verification items of the effect verification of the service associated with the selected service node E. FIG. 10 shows a state in which the tab TD is selected on the setting screen 30. The design support unit 212 displays on the display area 31 a screen 32 on which the verification items are displayed as a list (hereinafter, referred to as a verification item screen) as the providing means.

As shown in FIG. 10, the verification item screen 32 includes an item list 311 and an item addition button 312. The item list 311 includes "ID," "Item name," and "Definition" and verification items which are targets to be defined are displayed as a list. The "ID" is data for identifying each verification item. In "Item name," the name of each verification item is displayed. In "Definition," information indicating whether the verification item is defined or not defined is displayed.

Here, the design support unit 212 extracts the verification items associated with the service node E selected as the first receiving means from the KPI tree as the extracting means and displays the extracted verification items in the item list 311 as the providing means. For example, the design support unit 212 following the nodes from the selected service node E to the final goal node A for example, determining goal nodes (final goal node A and intermediate goal node B) associated with the service node E. Then, on the basis of the goal contents of the determined goal node, the design support unit 212 extracts the verification items associated with the effect verification of the service of the service node E. Subsequently, the design support unit 212 displays the extracted verification items in the item list 311 in order from the parent node.

For example, in the KPI tree of FIG. 5, when the service node Ea (service A) is selected, the design support unit 212 determines "Sales" in the final goal node A, "Average sales per customer" in the intermediate goal node Bb, and "Number of sold goods" in the intermediate goal node Bc. Then, the design support unit 212 extracts the determined goal nodes A, Bb, and Bc as verification items. Then, the design support unit 212 displays the extracted verification items in the item list 311 in order from the parent node (see FIG. 10). It should be noted that ID1 to ID3 correspond to the verification items extracted from the final goal node A and the intermediate goal nodes Bb and Bc.

In this manner, when the service node E is selected, the design support unit 212 extracts the goal contents of KPI node and KGI node associated with the selected service node E as verification items. Then, the design support unit 212 displays the extracted verification items in the item list 311 as specification-setting targets. Accordingly, the user can easily set and confirm the specification associated with the effect verification while confirming the goal contents of the parent node associated with the service node E with respect to the service of the service node E selected from the KPI tree.

The item addition button 312 is an operation element for adding a verification item. The design support unit 212 receives an operation on the item addition button 312 as the second receiving means. Then, as the editing means, the design support unit 212 adds an ID to the item list 311 and receives the input of verification items which are definition setting targets.

In FIG. 10, in the item list 311, item names of added and input verification items are shown as "Number of coupons issued" with an ID 4 and "Coupon use rate" with an ID 5. The item names of the added verification items are not particularly limited and can be arbitrarily set. However, the design support unit 212 may present candidates of the verification items on the basis of the setting contents of the factor node C and the solution node D present above the service node E.

For example, in FIG. 5, in a case where the service node Ea is selected, the design support unit 212 may present a verification item associated with "Coupon issue" set to the upper-level solution node Dc as a candidate. In this case, for example, a verification item as a candidate is prepared in advance in association with a keyword such as "Coupon", such that the verification item corresponding to the setting contents of the factor node C and the solution node D can be presented. It should be noted that the design support unit 212 may display in the item list 311 a verification item selected on the basis of the contents of the factor node C and the solution node D together with the verification items extracted from the goal node.

Moreover, when setting the specification associated with the verification items, the user performs an operation of instructing to edit the specification with respect to the verification items as the targets displayed in the item list 311. For example, when an operation such as right click is performed on a verification item displayed in the item list 311, the design support unit 212 displays an operation menu 313 as shown in FIG. 10 as the second receiving means. Then, when "edit" is instructed from the operation menu 313, the design support unit 212 displays a screen (hereinafter, also referred to as a definition screen) that allows editing the specification associated with the effect verification with respect to a verification item as an operation target as the editing means. It should be noted that in a case where "Delete" is instructed from the operation menu 313, the design support unit 212 deletes a verification item as an operation target from the item list 311 as the editing means.

FIG. 11 is a diagram showing an example of the screen provided by the design support unit 212. It should be noted that FIG. 11 is a display example of a definition screen 40 regarding the verification item of the item name "Coupon use rate" with the ID 5 displayed in the item list 311 in FIG. 10.

As shown in FIG. 11, the definition screen 40 includes a definition area 41 and a figure region 42. In the definition area 41, each item (hereinafter, also referred to as a definition item) which is a specification-setting target and an input area for defining the specification are displayed. The definition item includes "Item name," "Display unit," "Number of digits after decimal point of numeric value," "Definition of numeric value and calculation expression," "Availability," "Aggregation period," "Deadline," "Aggregation unit 1," "Aggregation unit 2," "Display format" for example.

Here, "Item name" corresponds to the item name of the verification item selected from the item list 311 of the verification item screen 32 in the setting screen 30 in FIG. 10 and indicates the verification contents. In a case where "Item name" has already been set, its item name is displayed in the input area. It should be noted that the item name of the input area can be edited and, in a case where the item name of the input area has been edited, the edited item name is also reflected to the item list 311 of the setting screen 30.

"Display unit" defines a unit when displaying values of "Item name." For example, by inputting the input area corresponding to the unit of "%" or the like, the unit when displaying the item corresponding to "Item name" can be defined. FIG. 11 shows an example in which to use "%" as the display unit of "Coupon use rate" is defined.

"Number of digits after decimal point of numeric value" defines the number of digits after the decimal point when displaying the values of "Item name." For example, by inputting the input area corresponding to the number of digits of "0" or the like, the number of digits displaying numbers after the decimal point can be defined. FIG. 11 shows an example in which the number of digits after the decimal point of "Coupon use rate" is set to "0".

"Definition of numeric value and calculation expression" defines definition and calculation expression of elements for deriving the values of "Item name." FIG. 11 shows an example in which dividing the number of coupon used by the number of coupons issued is defined in order to derive "Coupon use rate".

"Availability" defines whether or not the element for deriving the values of "Item name" can be acquired with the current system configuration. For example, in a case where the element can be acquired with the current system configuration, information about the availability or the like is input to the corresponding input area. Moreover, for example, in a case where the element cannot be acquired with the current system configuration, information about necessity or the like of development for acquiring the element can be input to the corresponding input area. FIG. 11 shows an example in which "Development is necessary" indicating the unavailability is input. It should be noted that although the information indicating the availability can be selectively input in FIG. 11, the present technology is not limited thereto.

"Aggregation period" defines an aggregation period for deriving the values of "Item name," i.e., an element collection period required for the deriving. For example, a period such as "daily," "monthly," or "annual" can be input to "Aggregation period." FIG. 11 shows an example in which "monthly" is input. It should be noted that although the aggregation period can be selectively input in FIG. 11, the present technology is not limited thereto.

"Deadline" defines a deadline of "Aggregation period." For example, any year, month, and date can be defined as "Deadline." FIG. 11 shows an example in which "25th" has been input as a deadline of "Monthly".

"Aggregation unit 1" and "Aggregation unit 2" define a display unit of axis elements and a display unit of a graph when displaying the values of "Item name" in the form of the graph. For example, "Aggregation unit 1" defines a display unit in a horizontal axis direction of a 2-axis graph. In this case, the values of "Item name" are set to a vertical axis direction. Moreover, for example, "Aggregation unit 2" is for defining the aggregation unit of the graph displayed in the 2-axis graph.

FIG. 11 shows an example in which the months of April 2022 to September 2022 are set to the aggregation unit as "Aggregation unit 1." Moreover, FIG. 11 shows an example in which the apparatuses of POS1 to POS3 are set to the aggregation unit as "Aggregation unit 2." Here, it is assumed that POS1 to POS3 are three commodity sales data processing apparatuses included in the settlement system set in the business flow of FIG. 7, for example, and the coupon use rate is displayed in the form of a graph for each commodity sales data processing apparatuses.

"Display format" defines a display format of a graph when displaying the values of "Item name" in the form of the graph. For example, a graph type such as a bar chart or a line graph can be input in "Display format." FIG. 11 shows an example in which the line graph has been input. It should be noted that although the display format can be selectively input in FIG. 11, the present technology is not limited thereto.

On the other hand, in the figure region 42, a figure of a graph based on the definition input in (set to) the definition area 41 is displayed. Specifically, the design support unit 212 generates a figure of a graph for representing verification results on the basis of the specification of the definition items as the generating means. Then, the design support unit 212 displays the generated figure on the figure region 42 as the providing means.

Here, the figure of the graph is not a graph based on actual data, i.e., one that indicate actual measured values of the item name "Coupon use rate," but the figure of the graph is a sample for confirming a style or form the graph generated on the basis of the specification set to the definition area 41. FIG. 11 shows an example in which the figure of the graph of the coupon use rate is displayed where on the basis of the specification set to the definition area 41, the vertical axis is set as % of "Display unit" and the horizontal axis is set as months of April 2022 to September 2022 of "Aggregation unit 1." Moreover, in such a figure, the graph lines of POS1 to POS3 defined in "Aggregation unit 2" are represented by varying the types of lines.

It should be noted that the method of generating the figure is not particularly limited, and for example, the design support unit 212 may generate a figure by using sample data prepared in advance or may generate a figure by using random data. Moreover, for example, in a case where a KPI tree of another customer includes a service node E defined under a similar condition and there are actual measured values of the service of the service node E, the design support unit 212 may generate a figure by using the actual measured data. In this case, it is favorable to perform, for example, processing of removing outliers from the actual measured values. Moreover, the design support unit 212 may generate a figure based on the actual measured values by randomly setting values within a range of from a maximum value to a minimum value of the actual measured values.

Moreover, the graph type that can be input in "Display format" is not limited to the graph type for plotting data values of the item name, and the graph type may be a graph for displaying one of statistic representative values. In this case, the design support unit 212 may calculate a representative value such as an average value or a median value from actual measured values of another service defined under a similar condition, for example, and generate a graph representing the calculated representative value as a figure.

In this manner, as the generating means and the providing means, when various definitions are input in the definition area 41, the design support unit 212 displays on the figure region 42 a figure of the graph schematically representing verification results (aggregation results) of the verification item on the basis of the input definitions. Accordingly, the user can confirm a display form with the definitions input in the definition area 41 or may confirm validity of the input definitions by seeing the figure. Therefore, the design support unit 212 can support setting tasks of definitions associated with effect verification of a service to be provided.

When the design support unit 212 receives an operation of instructing to complete the editing, the design support unit 212 generates definition data in which the contents of various definition items defined in the definition area 41 are set. As the storing means, the design support unit 212 associates the generated definition data with the ID (verification item ID) and item name of the corresponding verification item and associates the generated definition data with a target service of the selected service node E and stores them in the service definition DB 263.

Moreover, the design support unit 212 causes "Definition" for a verification item whose definition data has been stored in the service definition DB 263 out of the verification items displayed in the item list 311 to display "defined." Moreover, the design support unit 212 causes "Definition" for a verification item whose definition data has not been stored in the service definition DB 263 out of the verification items displayed in the item list 311 to display "undefined".

It should be noted that although the definition screen 40 associated with the verification item "Coupon use rate" has been described in the above-mentioned example, the definition screen 40 including similar definition items is displayed also regarding other verification items. It should be noted that it is unnecessary to set all definition items displayed on the definition screen 40 and it is also possible to set only some of the definition items. Moreover, definition items on the definition screen 40 that can be set in accordance with characteristics of the verification items may differ and the definition screen 40 may be capable of editing, e.g., adding and deleting, the definition items.

Moreover, in a case of confirming (browsing) a specification of the verification items, the definition screen 40 may be used or the definition screen 40 whose specification is disabled to be edited may be used. In the latter case, the design support unit 212 may display an option for instructing to browse the specification on, for example, the operation menu 313 and may display the definition screen 40 that is disabled to be edited when this option is selected.

Referring back to FIG. 9, the display control unit 213 of the server apparatus 20 controls the display device 24 to display various screens on the display device 24. For example, the display control unit 213 displays various screens provided by the GUI providing unit 211 on the display device 24.

The operation receiving unit 214 of the server apparatus 20 receives a user operation via the operation device 25. For example, when the operation receiving unit 214 receives an operation with respect to various operation supporting screens displayed on the display device 24, the operation receiving unit 214 outputs the operation contents to the CPU 21.

Figure 12:
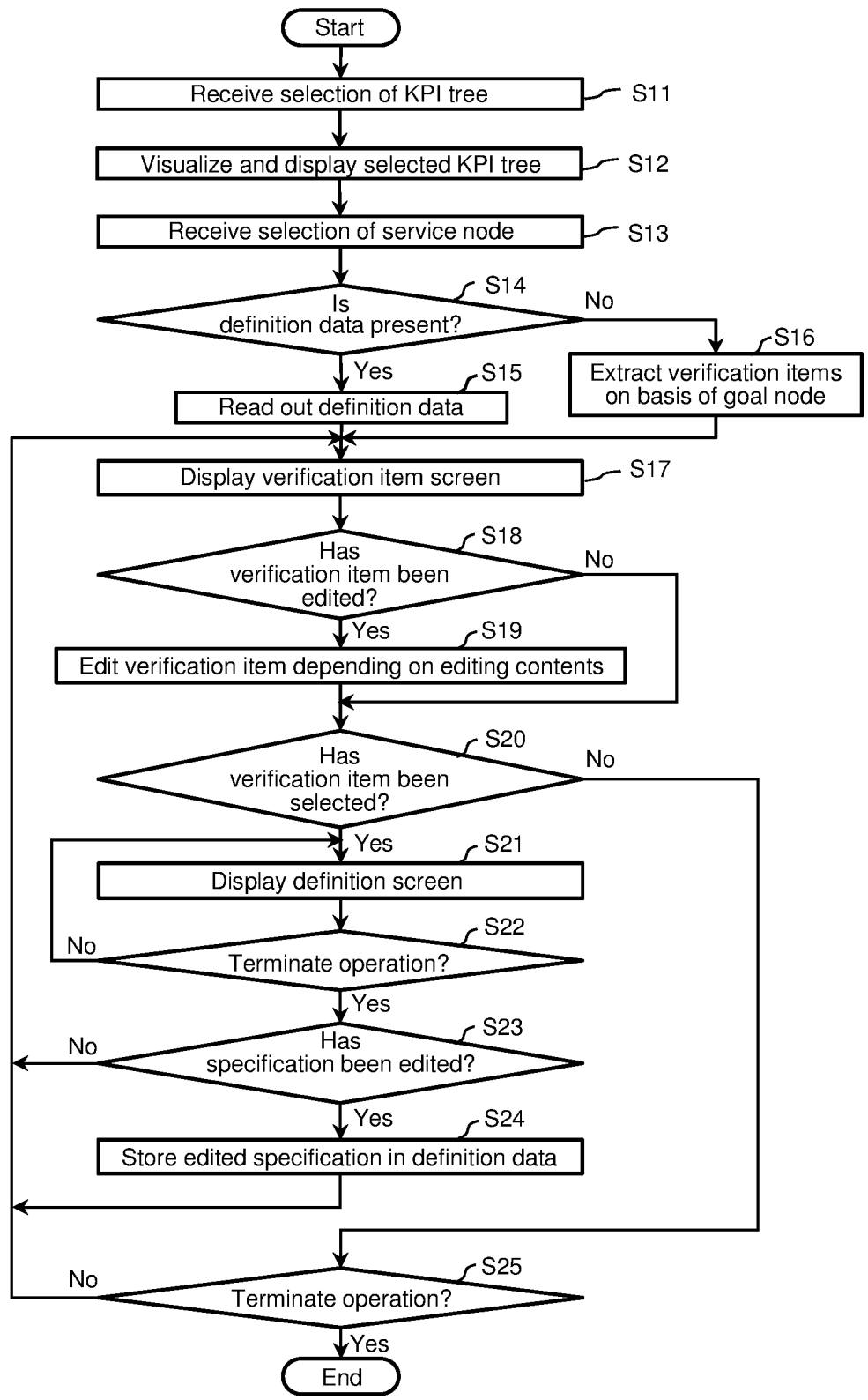
FIG. 12 is a flowchart showing an example of processing executed by the server apparatus according to the embodiment.

Hereinafter, an operation example of the server apparatus 20 will be described. FIG. 12 is a flowchart showing an example of processing executed by the server apparatus 20. It should be noted that in this processing, a setting function of the specification associated with the effect verification of the service out of functions of the server apparatus 20 will be described.

The CPU 21 executes programs stored in the memory (e.g., the ROM 22), thereby performing the following processing for setting the specification associated with the effect verification of the service as the design support unit 212. First of all, in Step S11, the design support unit 212 receives selection of a KPI tree as a display target from the KPI tree registered in the KPI tree DB 261 (see FIG. 4). Subsequently, in Step S12, the design support unit 212 visualizes and displays the selected KPI tree (see FIG. 5).

Subsequently, in Step S13, the design support unit 212 receives selection of the service node E as a setting target from the displayed KPI tree. When the service node E is selected, in Step S14, the design support unit 212 determines whether or not definition data associated with the selected service node E is present in the service definition DB 263 (see FIG. 8).

In a case where the definition data is present in the service definition DB 263 (Yes in Step S14), the processing of the design support unit 212 shifts to Step S15. In Step S15, the design support unit 212 reads out the definition data from the service definition DB 263. Subsequently, in Step S17, the design support unit 212 displays verification items set to this definition data on the verification item screen 32 (see FIG. 10).

Moreover, in a case where the definition data is absent in the service definition DB 263 (No in Step S14), the processing of the design support unit 212 shifts to Step S16. In Step S16, the design support unit 212 follows the selected service node E to the final goal node A, thereby determining goal nodes (final goal node A and intermediate goal node B) associated with the service node E. Then, the design support unit 212 extracts verification items on the basis of the goal contents of the determined goal node. Subsequently, in Step S17, the design support unit 212 displays the verification item screen 32 representing the extracted verification items.

Subsequently, in Step S18, the design support unit 212 determines whether or not an editing operation of the verification item (e.g., addition, deletion, or item name change) has been performed. In a case where the editing operation of the verification item has been performed (Yes in Step S18), the processing of the design support unit 212 shifts to Step S19. In Step S19, the design support unit 212, for example, adds or deletes the verification item depending on editing contents. Moreover, also in a case where the editing operation of the verification item is not performed (No in Step S18), the processing of the design support unit 212 shifts to Step S20. It should be noted that the design support unit 212 may store or update the definition data at the timing of Step S15 or S19.

In Step S20, the design support unit 212 determines whether or not any one verification item has been selected for editing or confirming the specification. Here, in a case where the verification item has been selected (Yes in Step S20), the processing of the design support unit 212 shifts to Step S21. In Step S21, the design support unit 212 displays the definition screen 40 that allows setting the specification associated with the effect verification with respect to the selected verification item. It should be noted that in a case where with respect to the verification item whose editing (or browsing) has been instructed, definition data is present in the service definition DB 263, the design support unit 212 displays a specification set in the definition data on the definition screen 40.

Here, the user can perform the editing operation (e.g., new input, change, or deletion) of the specification of the definition items by operating the definition screen 40. It should be noted that the design support unit 212 generates a figure schematically representing verification results associated with effect verification of the verification item on the basis of the specification set to each definition item and causes such an image to be displayed on the definition screen 40.

Subsequently, in Step S22, the design support unit 212 determines whether or not an operation end of the definition screen 40 has been instructed. In a case where the operation end of the definition screen 40 has not been instructed (No in Step S22), the processing of the design support unit 212 returns to Step S21. The design support unit 212 continues to display the definition screen 40 by returning to the processing of Step S21.

In a case where the operation end of the definition screen 40 has been instructed (Yes in Step S22), the processing of the design support unit 212 shifts to Step S23. In Step S23, the design support unit 212 determines whether or not the specification of the definition item have been edited. In a case where the specification of the definition item has not been edited (No in Step S23), the processing of the design support unit 212 returns to Step S17. The design support unit 212 returns to the processing of Step S17 and causes the verification item screen 32 to be displayed. Moreover, in a case where the specification has been edited (Yes in Step S23), the processing of the design support unit 212 shifts to Step S24. In Step S24, the design support unit 212 stores the edited specification in the definition data. Then, the processing of the design support unit 212 shifts to the processing of Step S17 and causes the verification item screen 32 to be displayed.

Moreover, in Step S20, in a case where it is determined that editing (or browsing) of the specification has not been instructed (No in Step S20), the processing of the design support unit 212 shifts to Step S25. In Step S25, the design support unit 212 determines whether or not the operation end of the verification item screen 32 has been instructed.

Here, in a case where the operation end of the verification item screen 32 has not been instructed (No in Step S25), the processing of the design support unit 212 returns to Step S17. The design support unit 212 continues to display the verification item screen 32 by returning to Step S17. On the other hand, in a case where the operation end of the verification item screen 32 has been instructed (Yes in Step S25), the design support unit 212 terminates the processing shown in FIG. 12.

It should be noted that although the definition data is stored (or updated) every time the specification of the verification item is set in the processing shown in FIG. 12, the embodiment is not limited thereto. For example, the design support unit 212 may store definition data associated with the verification items, on which the editing operation of the specification has been performed, together at a timing when the operation end of the verification item screen 32 is instructed.

As described above, when the service node E is selected from the KPI tree, the server apparatus 20 according to the present embodiment extracts verification items associated with the effect verification of the service on the basis of the goal contents of the goal nodes associated with the service node E. Then, the server apparatus 20 provides a screen that allows setting the specification associated with the effect verification to the user with respect to the extracted verification items.

Accordingly, the server apparatus 20 can cause the user to perform setting tasks of a specification associated with the effect verification while considering and confirming the goal contents of the upper-level goal node, which should be an aim, with respect to the service of the service node E as a setting target. Therefore, the server apparatus 20 can support the setting tasks of the specification associated with the effect verification of the service.

Moreover, the server apparatus 20 stores a set specification in association with the service node E and the verification item. Then, the server apparatus 20 provides the user with a screen representing a specification set to the verification item when the service node E is selected. Accordingly, the server apparatus 20 can allow the definitions of the specification associated with the effect verification of the service to be shared between the related people engaged with the design.

Moreover, the server apparatus 20 receives selection of the service which is a setting or browsing target of the specification by a selection operation of the service node E set to the KPI tree. Accordingly, the server apparatus 20 can improve the convenience of the user associated with selection of the service.

It should be noted that the above-mentioned embodiment can also be modified as appropriate and carried out by changing some of the configurations or functions of each of the above-mentioned apparatuses. In view of this, some modified examples according to the above-mentioned embodiment will be described hereinafter as other embodiments. It should be noted that points different from the above-mentioned embodiment will be mainly described hereinafter, and detailed descriptions of points common to the contents already described will be omitted. Moreover, the modified example described hereinafter may be separately carried out or may be carried out in combination as appropriate.

Modified Example 1

In the above-mentioned embodiment, the example in which various screens provided from the server apparatus 20 are displayed on the terminal apparatus 10 by cooperation of the terminal apparatus 10 and the server apparatus 20 has been described, though not limited thereto. The terminal apparatus 10 may display the various screens without using the server apparatus 20.

In this case, the terminal apparatus 10 includes the functional blocks, e.g., the GUI providing unit 211 and the design support unit 212, such that the terminal apparatus 10 is capable of displaying various associated with editing and screens confirming of the definition associated with the effect verification of the service node E. It should be noted that the terminal apparatus 10 is capable of reading and writing various DBs retained by the server apparatus 20.

Moreover, in this case, the terminal apparatus 10 may retain some or all of the KPI tree DB 261, the business flow DB 262, and the service definition DB 263 or another apparatus (or the cloud) that can be accessed by the terminal apparatus 10 may retain some or all of the KPI tree DB 261, the business flow DB 262, and the service definition DB 263.

Modified Example 2

In the above-mentioned embodiment, the server apparatus 20 stores and manages the business flow in association with the service node E of the KPI tree, though not limited thereto. Not associated with the service node E, the server apparatus 20 may store and manage only the business flow.

It should be noted that the program executed by each apparatus according to the above-mentioned embodiment is provided in a state incorporated in the ROM, the storage device, or the like in advance. The program executed by each apparatus according to the above-mentioned embodiment may be configured to be recorded and provided in a computer-readable recording medium such as a CD-ROM, a flexible disk (FD), a CD-R, or a digital versatile disk (DVD) as an installable or executable file.

In addition, the program executed by each apparatus according to the above-mentioned embodiment may be configured to be stored in a computer connected to a network such as the Internet and provided by downloading via the network. Moreover, the program executed by each apparatus according to the above-mentioned embodiment may be configured to be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a tree database that stores tree data in which a relationship between a goal node indicating a management goal and a service node indicating contents of a service for realizing the goal is set in a tiered manner in a tree structure;
a display device that displays a screen for setting a specification associated with effect verification of the service;
an operation device that receives an operation with respect to the displayed screen;
a memory that stores a program for setting the specification associated with the effect verification of the service;
a processor configured to, in accordance with the program,
cause the display device to display a tree including the goal node and service node connected in a tiered manner on a basis of the tree data,
select the service node included in the displayed tree via an operation received by the operation device, extract verification items associated with effect verification of the contents of the service on a basis of goal contents of the goal node associated with the selected service node, and cause the display device to display a screen that allows setting, for each of the extracted verification items, a specification associated with effect verification of the verification item; and a service definition database that stores a specification set on a screen that allows setting the specification as setting information in association with the selected service node and the verification item, wherein the processor in a case where the setting information is not stored in the service definition database in association with the selected service node, causes the display device to display the screen that allows setting the specification, and stores the specification set on the screen that allows setting the specification in the service definition database as the setting information.

2. The information processing apparatus according to claim 1, wherein the processor causes the display device to display a screen on which a list of the extracted verification items is displayed, and receives an editing operation of the verification item in accordance with an operation with respect to the screen on which the list of the verification items is displayed, the operation being received by the operation device.

3. The information processing apparatus according to claim 2, wherein in a case where the processor receives the editing operation of the verification item, the processor causes the display device to display a screen that allows setting the specification.

4. The information processing apparatus according to claim 2, wherein the processor adds or deletes the verification item in accordance with the received editing operation.

5. The information processing apparatus according to claim 2, wherein the processor displays, for each of the verification items, an operation menu for editing the verification item in accordance with an operation with respect to the screen on which the list of the verification items is displayed, the operation being received by the operation device.

6. The information processing apparatus according to claim 1, wherein the processor generates, on a basis of a specification set on a screen that allows setting the specification, a figure schematically representing a verification result associated with the effect verification of the verification item, and causes the figure to be displayed on the screen that allows setting the specification.

7. The information processing apparatus according to claim 1, wherein in a case where the setting information is stored in the service definition database in association with the selected service node, the processor causes the display device to display a screen representing the specification set to the verification item on a basis of the stored setting information.

8. An information processing method, comprising:

storing, in a tree database, tree data in which a relationship between a goal node indicating a management goal and a service node indicating contents of a service for realizing the goal is set in a tiered manner in a tree structure;

causing, by a processor, a display device to display a tree including the goal node and service node connected in a tiered manner on a basis of the tree data;

selecting, by the processor, the service node included in the displayed tree via an operation received by an operation device;

extracting, by the processor, verification items associated with effect verification of the contents of the service on a basis of goal contents of the goal node associated with the selected service node;

causing, by the processor, the display device to display a screen that allows setting, for each of the extracted verification items, a specification associated with effect verification of the verification item;

storing, in a service definition database, a specification set on a screen that allows setting the specification as setting information in association with the selected service node and the verification item;

in a case where the setting information is not stored in the service definition database in association with the selected service node, causing, by the processor, the display device to display the screen that allows setting the specification; and storing, by the processor, the specification set on the screen that allows setting the specification in the service definition database as the setting information.

* * * * *